United States Patent [19]
Pizano et al.

[11] Patent Number: 5,991,365
[45] Date of Patent: Nov. 23, 1999

[54] REMOTE PHONE-BASED ACCESS TO A UNIVERSAL MULTIMEDIA MAILBOX

[75] Inventors: Arturo A. Pizano, Belle Mead, N.J.; Frank K. Li, Snoqualmie, Wash.

[73] Assignee: Siemens Corporate Research, Inc., Princeton, N.J.

[21] Appl. No.: 08/815,785

[22] Filed: Mar. 12, 1997

[51] Int. Cl.[6] .................................................. H04M 1/64
[52] U.S. Cl. ................................. 379/88.13; 379/88.14; 379/100.13
[58] Field of Search ............................. 379/67.1, 88.07, 379/88.08, 90.01, 93.01, 93.09, 93.15, 93.24, 100.01, 100.08, 201, 100.13, 100.11, 88.12, 88.14, 88.22, 88.13; 358/400, 402, 403; 348/14, 18

[56] References Cited

U.S. PATENT DOCUMENTS

| | | | |
|---|---|---|---|
| 4,837,798 | 6/1989 | Cohen et al. | 379/88 |
| 4,972,462 | 11/1990 | Shibata | 379/89 |
| 5,479,411 | 12/1995 | Klein | 370/110.1 |
| 5,497,373 | 3/1996 | Hulen et al. | 370/79 |
| 5,517,556 | 5/1996 | Pounds et al. | 379/67 |
| 5,521,841 | 5/1996 | Arman et al. | 364/514 R |
| 5,524,137 | 6/1996 | Rhee | 379/67 |
| 5,530,740 | 6/1996 | Irribarren et al. | 379/89 |
| 5,557,659 | 9/1996 | Hyde-Thompson | 379/88 |
| 5,633,916 | 5/1997 | Goldhagen et al. | 379/67 |
| 5,724,406 | 3/1998 | Juster | 379/67 |
| 5,729,741 | 3/1998 | Liaguno et al. | 395/615 |
| 5,737,395 | 4/1998 | Irribarren | 379/88 |
| 5,740,231 | 4/1998 | Cohn et al. | 379/89 |
| 5,751,791 | 5/1998 | Chen et al. | 379/88 |
| 5,838,313 | 11/1998 | Hou et al. | 345/302 |

*Primary Examiner*—Scott Weaver
*Attorney, Agent, or Firm*—Donald B. Paschburg

[57] ABSTRACT

A system that provides users with the capability to access messages contained in a remote universal multimedia mailbox interfaces with an underlying universal messaging server which provides a repository for voice, fax, e-mail, etc. . . . This interface is accomplished through a standard e-mail protocol used to add voice reply messages from a message generator to the universal mailbox through the universal messaging server as well as through a message management library contained within a mailbox access manager that provides access to message components contained in the universal mailbox. The operation of the present invention is guided by a telephony attendant which interfaces with a telephone. The telephony attendant also controls a media converter which converts media to fax or media to audio and an audio/fax player which interfaces with the telephone or a fax machine.

20 Claims, 16 Drawing Sheets

FIG. 6

SIEMENS
SIEMENS CORPORATE RESEARCH, INC.
755 COLLEGE ROAD EAST∗PRINCETON, NEW JERSEY 08540∗(609)734-6500∗TELEFAX:(609)734-6565

TELEFAX TRANSMITTAL

```
DATE:        WED AUG 21 12:37:47 EDT 1996
FAX NUMBER:  (999) 555 1212
TO:          JOHN DOE
FROM:        SMMS
SUBJECT:     INBOX STATUS
```

| | SENDER | SUBJECT | ATT | DATE | # |
|---|---|---|---|---|---|
|  | arture@robin. | SAMPLE MULTIMEDIA MESSAGE | 4 | WED APR 3 11:47:19 | 1 |
|  | A. PIZANO @ 3 | --- | 0 | WED MAR 6 11:01:30 | 2 |
|  | UNKNOWN SOURCE | --- | 0 | WED MAR 6 11:11:00 | 3 |
|  | J. SMITH @ 55 | --- | 0 | WED MAR 6 13:09:54 | 4 |
|  | arture@robin. | SAMPLE ANNOTATED MESSAGE | 1 | MON APR 15 13:23:00 | 5 |
|  | arture@robin. | SAMPLE FAX WITH MARKERS | 1 | MON APR 15 13:44:53 | 6 |
|  | arture@robin. | ACTIVE MESSAGE ATTACHMENTS | 3 | SAT APR 13 06:12:34 | 7 |
|  | arture@robin. | ACTIVE MESSAGE ATTACHMENTS | 1 | MON JUL 8 09:51:07 | 8 |

SIEMENS
SIEMENS CORPORATE RESEARCH, INC.
755 COLLEGE ROAD EAST*PRINCETON, NEW JERSEY 08540*(609)734-6500*TELEFAX: (609)734-6565

TELEFAX TRANSMITTAL

```
DATE:        WED AUG 21 12:37:47 EDT 1996
FAX NUMBER:  (999) 555 1212
TO:          JOHN DOE
FROM:        SMMS
SUBJECT:     INBOX STATUS
```

FIG. 15

SIEMENS
SIEMENS CORPORATE RESEARCH, INC.
755 COLLEGE ROAD EAST*PRINCETON, NEW JERSEY 08540*(609)734-6500*TELEFAX:(609)734-6565

TELEFAX TRANSMITTAL

```
DATE:        THU JAN 6 19:06:25 EDT 1996
FAX NUMBER:  (999) 555 1212
TO:          JOHN DOE
FROM:        SMMS
SUBJECT:     MESSAGE 1
```

```
SUBJECT: SAMPLE MULTIMEDIA MESSAGE
   DATE: WED APR  3 11:47:19 EST  1996
   FROM: arture@robin.ser.siemens.com
     CO: buchta@ser.siemens.com
```

THIS IS A SIMPLE TEST MESSAGE THAT ILLUSTRATES THE TYPES OF ATTACHMENTS THAT CAN BE INCLUDED IN A E-MAIL.

HAVE FUN....

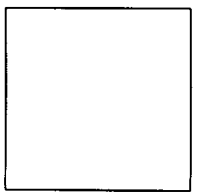 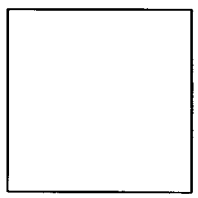  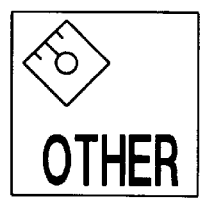

(1)medical_1.ppm   (2)alter]dalice.mjpeg   (3)sanford.--   (4)fritz.gif

REMOTE PHONE-BASED ACCESS TO A UNIVERSAL MULTIMEDIA MAILBOX

RELATED APPLICATION

This patent application is related to copending patent application serial number 08,815,786, entitled "System For Digital Video Browsing Using Telephone And Fax" assigned to the same assignee as the present invention and filed concurrently herewith.

BACKGROUND OF THE INVENTION

1. Field of the Invention

The present invention relates to accessing messages contained in remote universal multimedia mailboxes and more particularly to extending access to environments where computer systems are not available.

2. Description of the Prior Art

Electronic messaging services including electronic mail, voice mail and digital fax are common in today's business and home environments. In addition a trend towards universal or unified messaging is currently underway. It is an object of the present invention to develop a system that operates under the assumption that an extensible Universal Messaging System with basic message storage-and-forward capabilities is in place. Such systems are now commercially available as described in "Unified Messaging" Computer Telephony Magazine, August 1996.

The prior art also includes voice mail systems such as the one described in U.S. Pat. No. 5,568,540 entitled "Method and Apparatus for Selecting and Playing a Voice Mail Message". This patent discloses a system which provides telephone-based remote message access. These systems however, are limited to voice and, in some instances, fax. It is a further object of the present invention to provide a system that addresses much more elaborate messages containing arbitrarily complex multimedia objects.

Some of the systems described in "Unified Messaging" also provide support for remote access of e-mail messages. However, this support is based on text-to-speech conversion only and is limited to the text portion of the message body. It is an object of the present invention to extend this functionality to every message class in the system, and to enhance it by incorporating the use of fax as a way to provide visual feedback on the content of the message. For example, an image or a video could be provided.

It is a further object of the present invention to provide a system capable of handling two special message classes: Dynamic image annotation which involves computer-generated messages in which synchronized voice, mouse movements and graphics are used to describe conditions associated with the contents of an underlying image; and browsable video messages which consists of video clips which have been pre-processed to identify scene changes and prepared for browsing. Such message types are not available in existing prior art systems.

SUMMARY OF THE INVENTION

The present invention is a system that provides users with the capability to access messages contained in a remote universal multimedia mailbox. There are two interfaces between the present invention and an underlying universal messaging server which provides a repository for voice, fax, e-mail, etc. . . . The first interface is the standard e-mail protocol used to add voice reply messages from a message generator of the present invention to a universal mailbox through the universal messaging server. The second interface is a message management library contained within a mailbox access manager of the present invention that provides access to message components contained in the universal mailbox. The operation of the present invention is guided by a telephony attendant of the present invention which interfaces with a telephone. The telephony attendant also controls a media converter which converts media to fax or media to audio and an audio/fax player which interfaces with the telephone or a fax machine. The telephony attendant also communicates with the mailbox access manager to retrieve the number of messages in the mailbox. Overall, the present invention acts as a remote phone/fax messaging client (RPFMC).

BRIEF DESCRIPTION OF THE DRAWINGS

FIG. 6 illustrates a typical mailbox status fax.

FIG. 15 illustrates an example of a telefax transmittal of the present invention describing the contents of an e-mail message.

DETAILED DESCRIPTION OF THE INVENTION

The present invention is a system that provides the capability for people to access messages contained in a remote universal multimedia mailbox. Typically, the universal mailbox contains a combination of the following message classes:

voice mail: voice only messages typically generated via a phone fax: document images generated with a fax machine or a fax program multimedia e-mail: collection of multimedia objects (text, voice, images, . . . ) structured according to an accepted standard, e.g., MIME dynamically annotated images: computer generated messages containing synchronized voice, graphics and mouse gestures used to describe conditions associated with an underlying image.

video: video messages generated in a video phone or a workstation

Under normal circumstances this universal mailbox is accessed via tools that run on a fully functional computer system such as a personal computer or workstation. The present invention extends access to these message classes in environments where computer systems are not available, but telephones and fax machines are.

The operation of the present invention in a basic scenario is as follows. A user will call a predefined telephone number at the site where the mailbox is stored. The call is answered and processed at this site by an automated telephony attendant. This attendant gives users verbal instructions on how to access the messages and receives user commands in the form of touch tones generated with the keypad of a telephone. The system responds to user requests by playing audio versions of messages or message components over the phone, and visual representations by means of a fax machine which is presumed to be close to the place where the telephone call originates. A series of unique media conversion mechanisms is used together with off-the-shelf tools to support the desired functionality.

A particular feature of the present invention is the systems ability to handle two special message classes: Dynamic image annotation which involves computer-generated messages in which synchronized voice, mouse movements and graphics are used to describe conditions associated with the contents of an underlying image; and browsable video messages which consists of video clips which have been pre-processed to identify scene changes and prepared for browsing. Such message types are not available in existing prior art systems but are incorporated into the underlying Universal Messaging Server using the techniques described in U.S. patent application Ser. Number 08/560,566, filed Nov. 20, 1995, now U.S. Pat. No. 5,838,313, entitled "A Multimedia-based Reporting System With Recording And Playback Of Dynamic Annotation" and assigned to the same assignee as the present invention as well as U.S. Pat. No. 5,521,841 entitled "Browsing Contents Of A Given Video Sequence", issued May 28, 1996 and assigned to the same assignee as the present invention.

Figure 1:
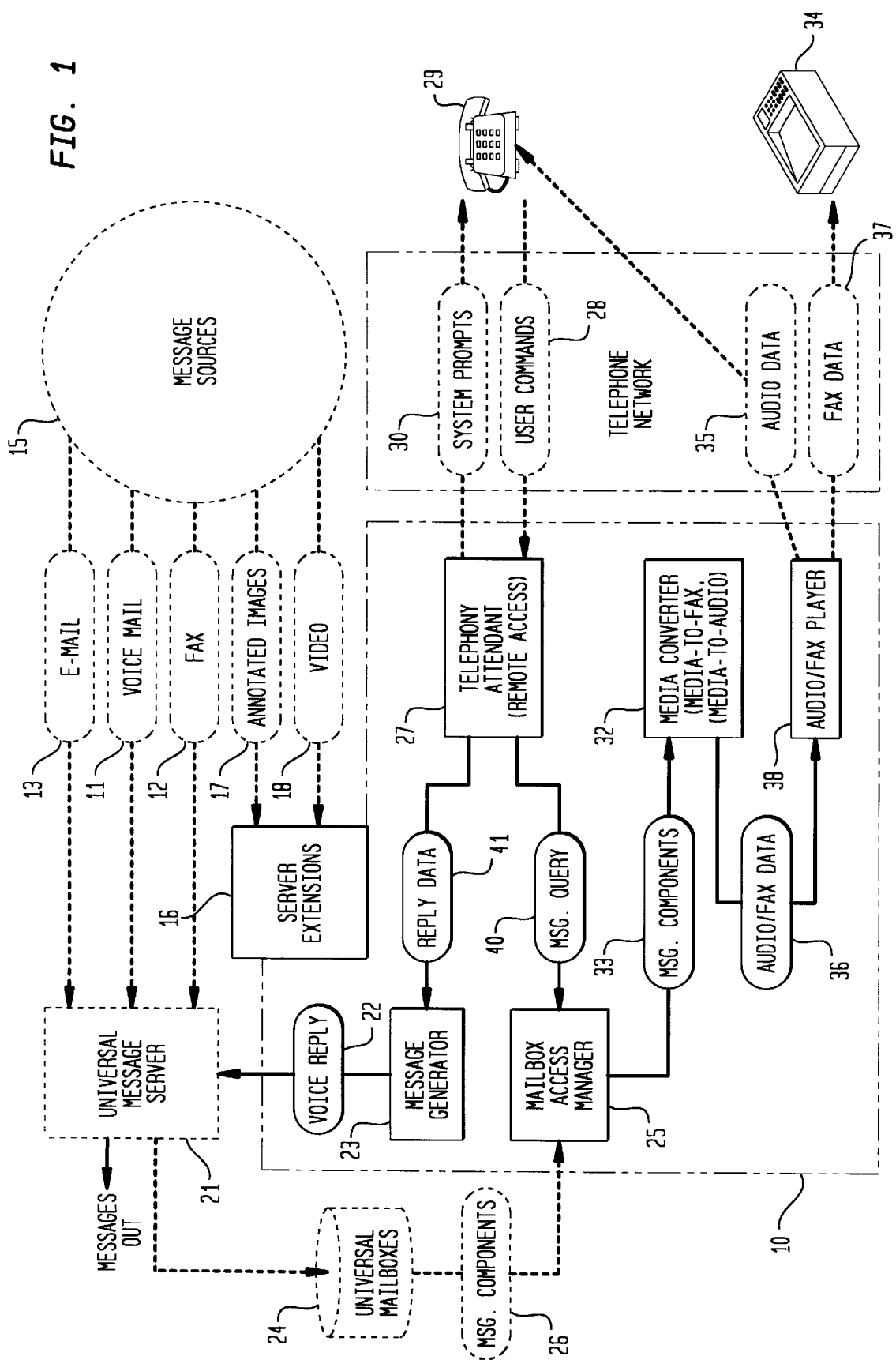
FIG. 1 illustrates a block diagram of the present invention and its interface to a universal mailbox, a universal messaging server, message sources and a telephone network.

FIG. 1 illustrates the main components of the present invention as well as the flow of data and messages. The present invention assumes that an underlying Universal Messaging Server, e.g., Microsoft's Exchange Server, will provide a single repository for voice mail 11, fax 12, and e-mail 13 which are provided from message sources 15. Other than receiving messages from message sources 15, universal messaging server 21 also delivers messages out to their destinations. In addition, the system is presumed to be extensible through server extensions 16 in order to support the incorporation of the dynamic annotated images 17 and video classes 18

Server extensions 16 allow new message classes to be represented customarily. Server extensions 16 also facilitates the pre-processing of those messages. For example, a video message could be passed to a scene change detector which generates the scene change icons and scene change list. The dynamic annotation inside an annotated image message could be segmented with reference to time and spatial information such that a user could jump into a particular segment of annotation during playback of the message.

As shown in FIG. 1, there are two interfaces between the present invention 10 and the universal messaging server 21: (1) the standard e-mail protocol used to add voice reply messages 22 from message generator 23 to universal mailbox 24 through universal messaging server 21; and (2) a message management library contained within mailbox access manager 25 that provides access to message components 26 contained in the universal mailbox 24. These are typical interfaces of existing messaging servers. Overall the present invention acts as a remote phone/fax messaging client (RPFMC).

The operation of the RPFMC 10 is guided by a telephony attendant 27 that performs the following functions:

Receives the call 28 from a telephone 29, greets the caller, and prompts 30 the customer for identification.

Guides a session during which the customer reviews the contents of the mailbox.

Issue queries 40 to the mailbox access manager 25 to retrieve message components 26 from mailbox 24, and interacts with media converter 32, which receives media message components 33 from mailbox access manager 25 and performs the transformations needed to present the data via phone 29 or fax 34.

Delivers audio and fax data 36 to audio/fax player 38 which delivers the information as audio data 35 through phone 29 or as fax data 37 through fax 34.

Records voice replies to e-mail messages 41 and handles them through message generator 23.

Figure 2:
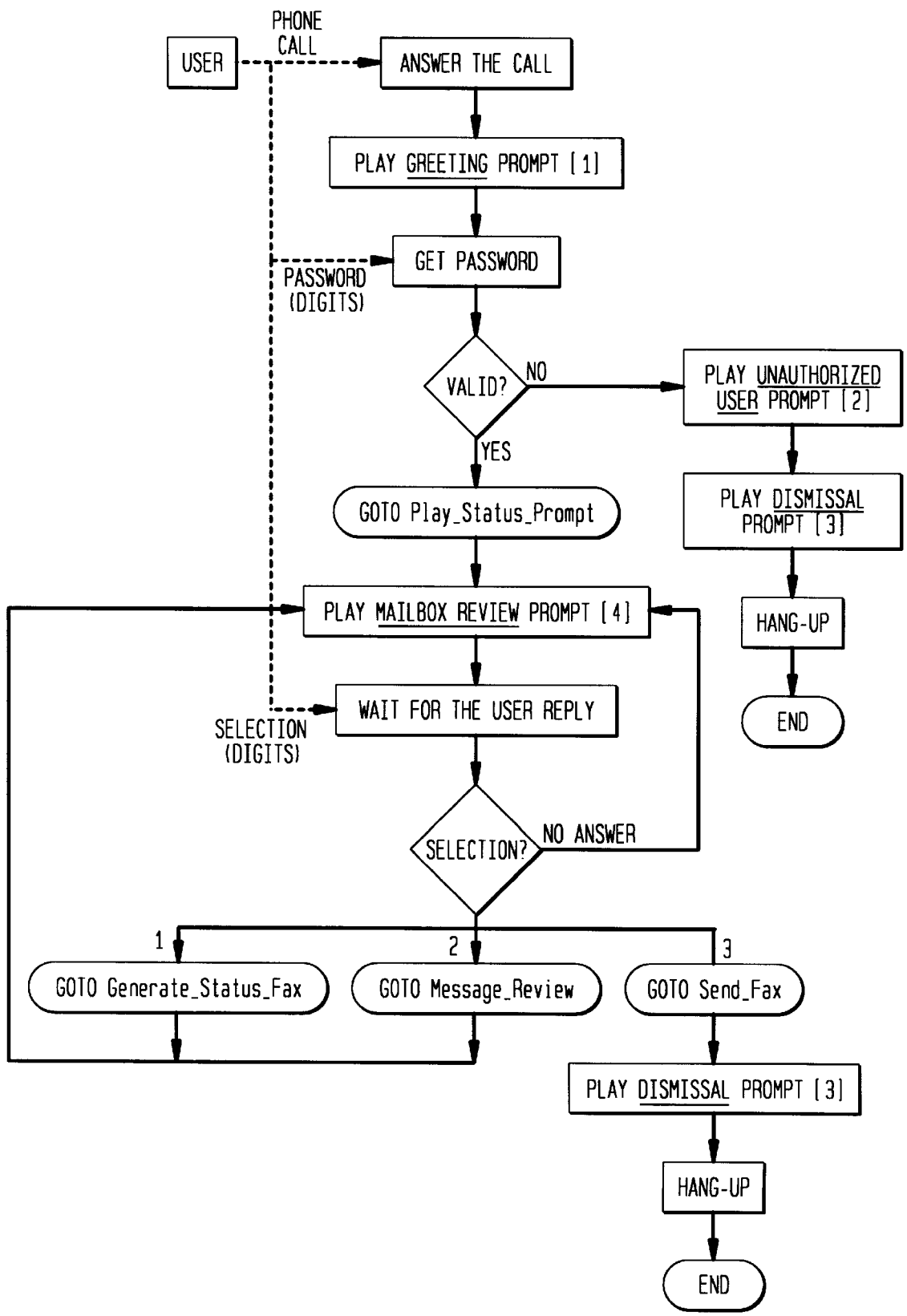
FIG. 2 illustrates a flow diagram of one embodiment of the telephony attendant of the present invention showing the global flow of a call.

More specifically, telephony attendant 27 performs the following tasks as illustrated in FIG. 2.

Answer the call, play a greeting prompt 30, and wait for the user to enter a password.

If the password is not correct, inform the user by playing an unauthorized user prompt and end the call playing a 'Dismissal' prompt.

Figure 3:
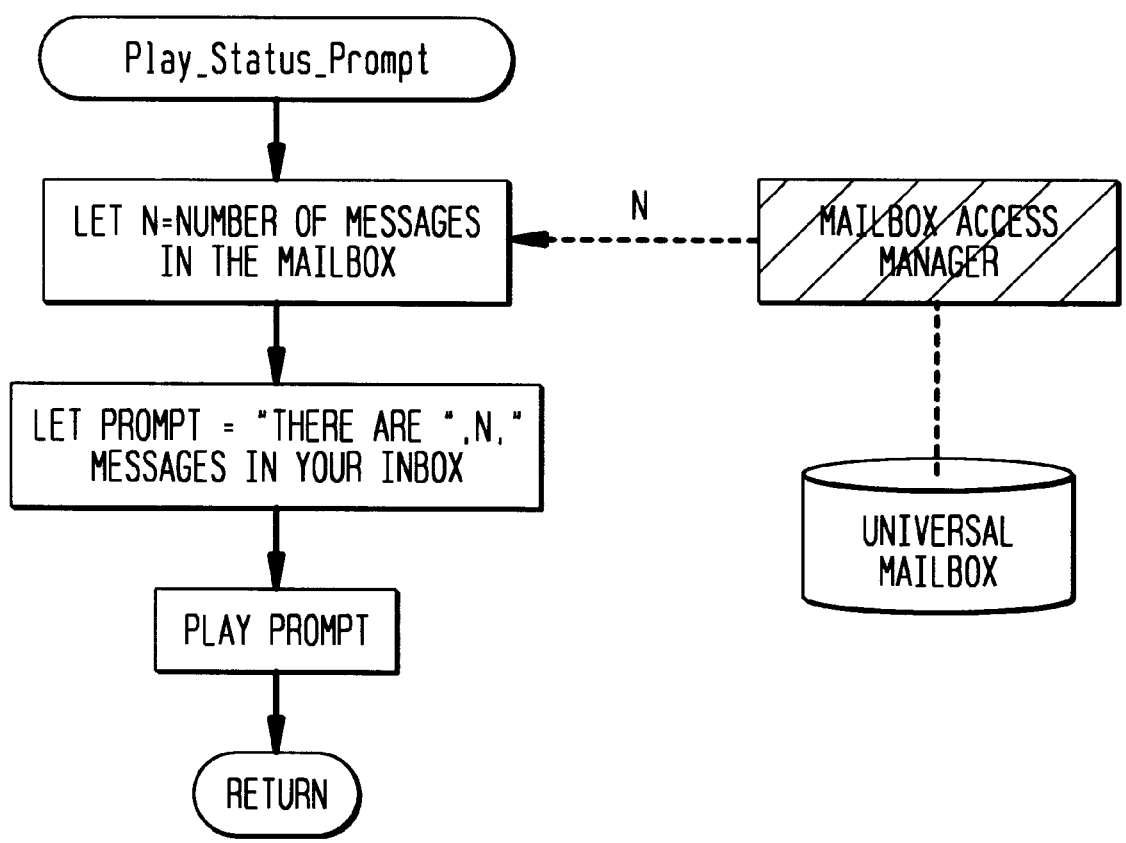
FIG. 3 illustrates a flow diagram of one embodiment of the mailbox access manager of the present invention where the mailbox status prompt is generated and played to the caller.

If the password is correct, report the status of the mailbox (FIG. 3) and provide a menu of alternatives as described in the mailbox-review prompt.

Wait for the selection and perform the function selected.

Playing the status prompt involves interaction through message query 40 between telephony attendant 27 and mailbox access manager 25, which in this situation examines the contents of mailbox 24 and returns a count of the messages found. This count is used to create a dynamic prompt 30 which is played to the user through the phone 29. This is further illustrated in the flow diagram of FIG. 3.

The user can reply to the originator of e-mail, through reply data 41, with the message generator 23. Message generator 23 records voice from the user, composes it as an e-mail message and submits it to universal messaging server 21 which delivers it as a voice message to the originator.

The telephony attendant follows the playback of the status prompt, with the playback of a prompt that offers three options to the caller:

retrieve a high-level description of the mailbox (mailbox status fax) via fax;

proceed to review each message in detail; or, exit the system.

Figure 4:
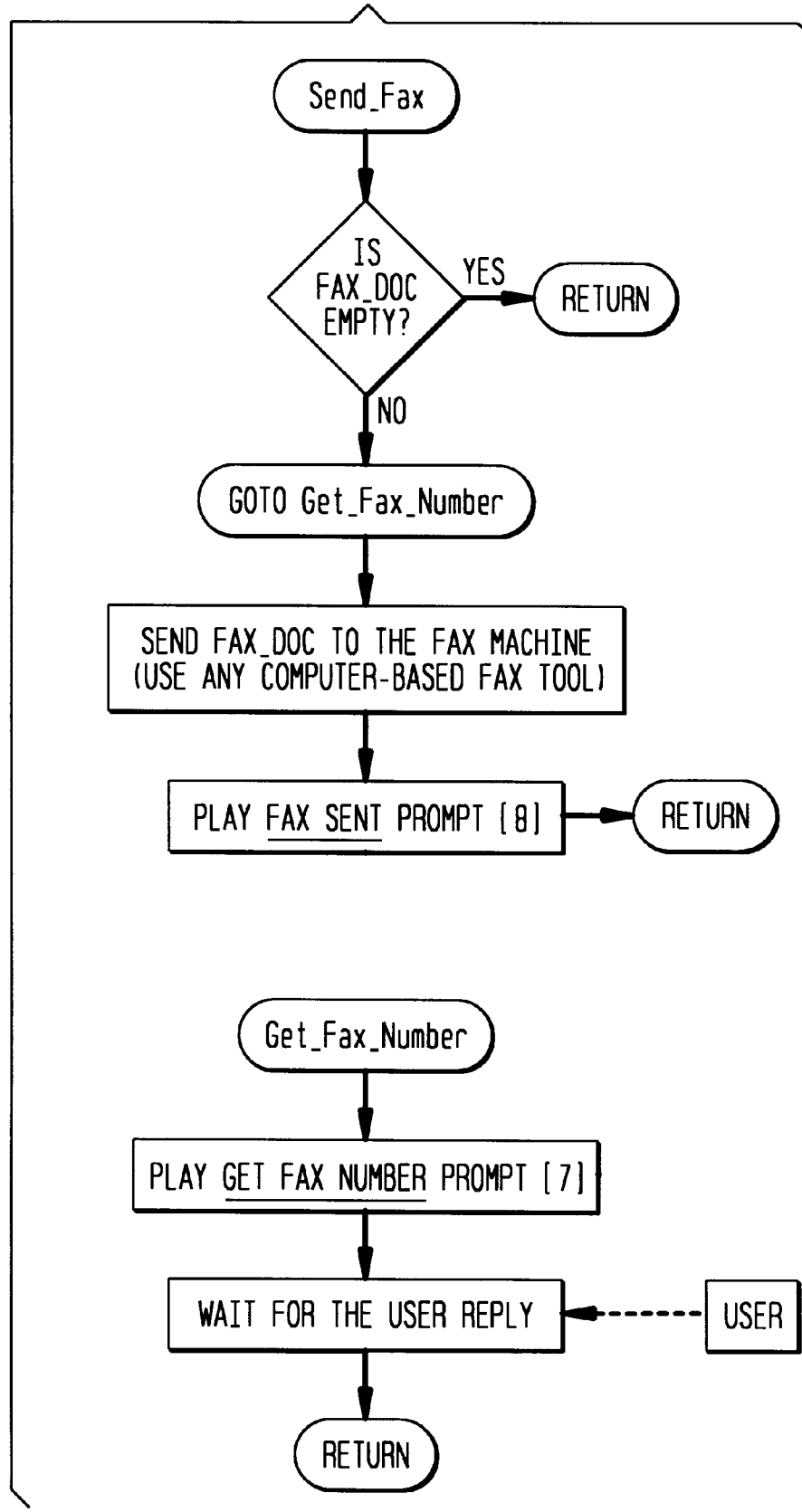
FIG. 4 illustrates a flow diagram of the operation of the present invention when checking whether a fax message has been prepared, when prompting the user for the necessary information, and when sending the fax to the destination fax machine.

In the last case the system of the present invention first checks to see if a fax message has been prepared and prompts the user for the necessary information. FIG. 4 illustrates a flow diagram of the operation of the system in this case.

Figure 5:
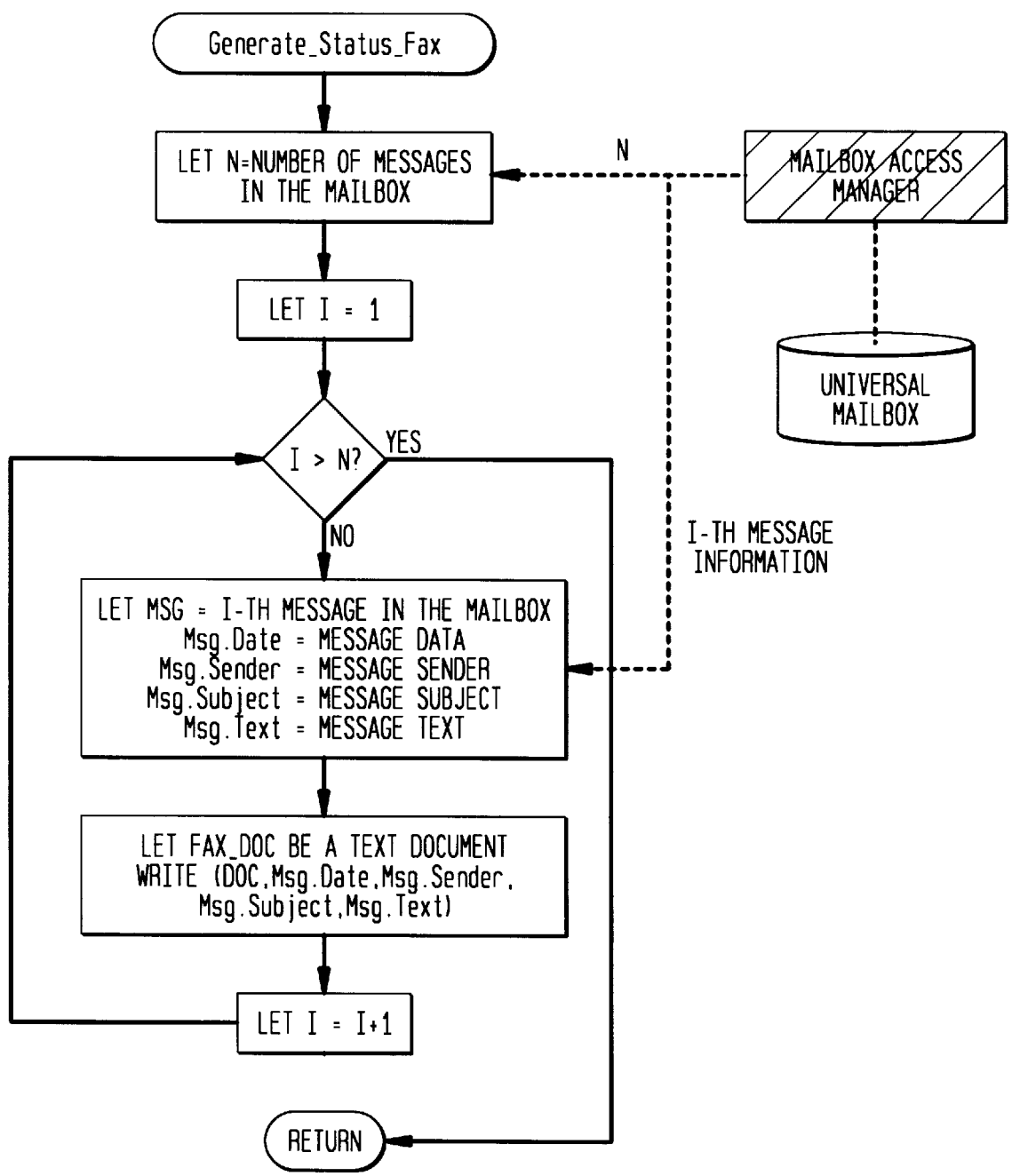
FIG. 5 illustrates a flow diagram of the telephony attendant of FIG. 2 communicating with the mailbox access manager of FIG. 3 to generate the mailbox status fax.

During the generation of the mailbox status fax, the telephony attendant communicates with the mailbox access manager to retrieve the number of messages in the mailbox. A flow diagram of this operation is illustrated in FIG. 5. The telephony attendant then proceeds to systematically add information about each individual message to an internal fax document. This information includes:

the message type, the sender, the subject, the date, and the number of attachments (e-mail only).

FIG. 6 illustrates a typical mailbox status fax. A document like this can be created by using a programmable word processing tool such as Microsoft Word 6.0.

Figure 7:
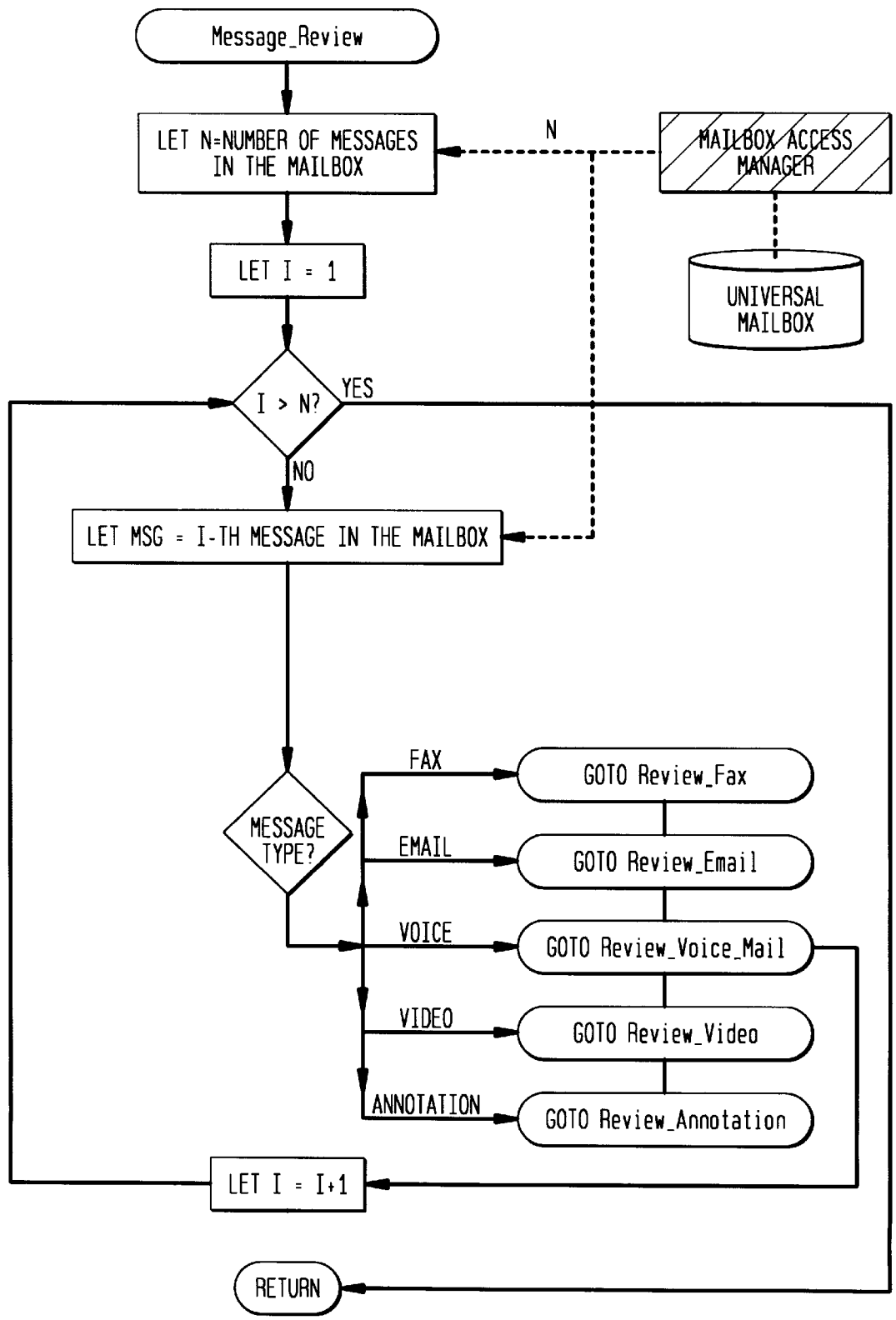
FIG. 7 illustrates a flow diagram of the loop that controls the operation of providing a more detailed view of the messages contained in the mailbox.

The next option available in the mailbox review prompt is a more detailed view of the messages contained in the mailbox. This option is made available to the user by means of a dynamically generated prompt that systematically plays back audible high-level message components (message type, sender, subject, etc. . . . FIG. 7 illustrates a flow diagram of the loop that controls this operation. Notice the interaction with the mailbox access manager to extract message information from the mailbox. In particular, the message type which determines the way in which the message is reviewed.

Figure 8:
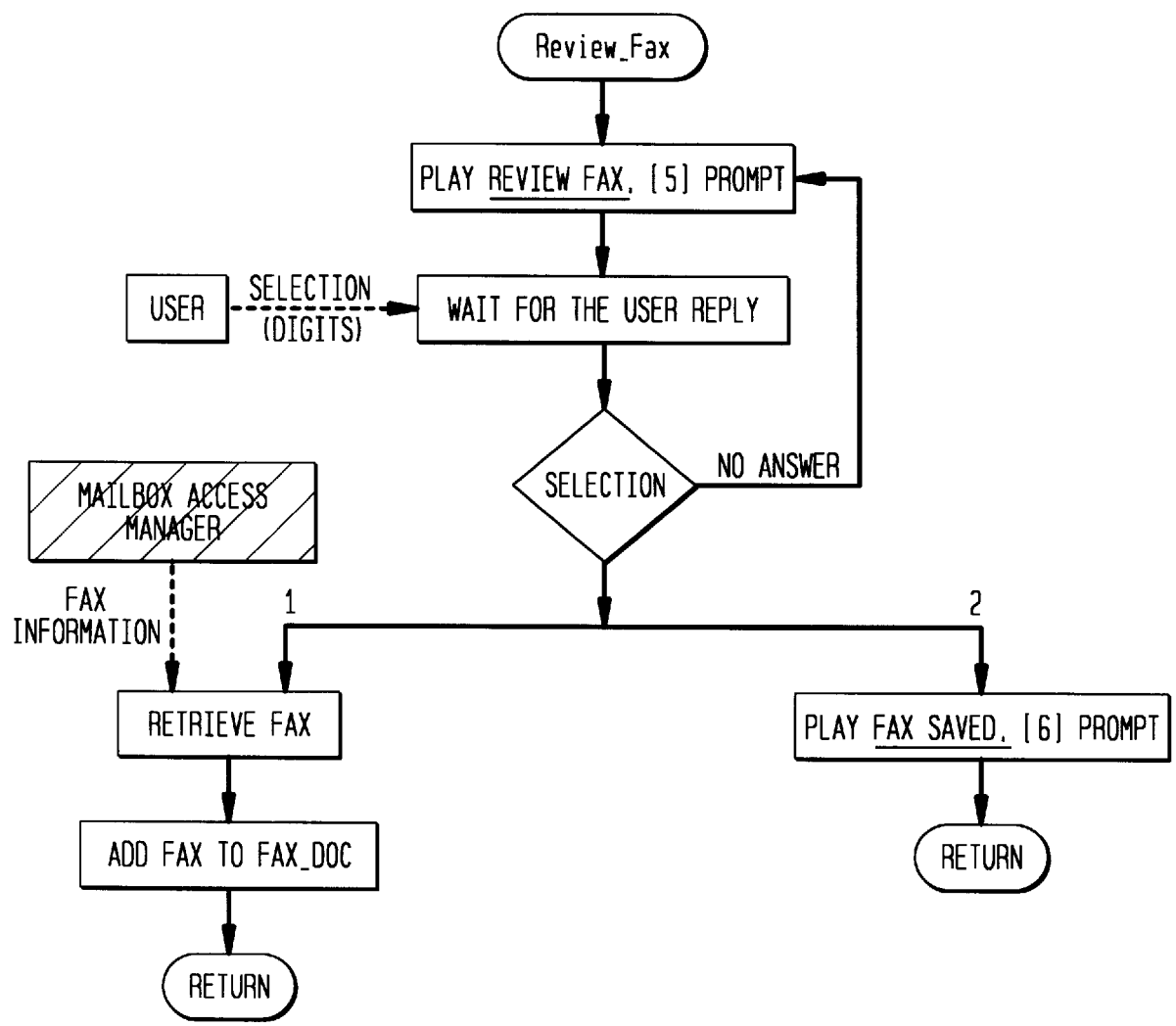
FIG. 8 illustrates a flow diagram of the steps used to review the contents of a fax.
Figure 9:
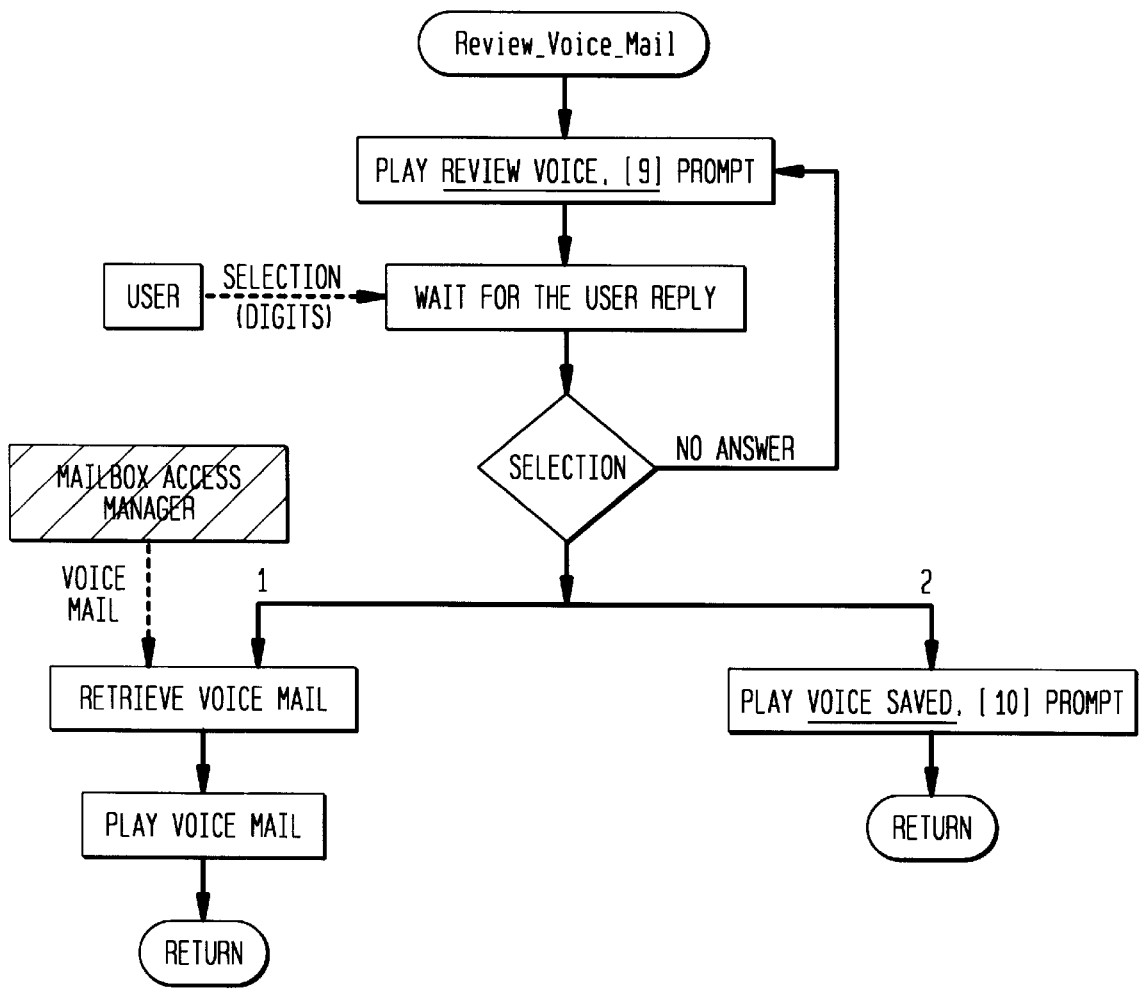
FIG. 9 illustrates a flow diagram of the steps used to review the contents of a voice message.

FIG. 8 illustrates a flow diagram for reviewing the contents of a fax and FIG. 9 illustrates a flow diagram for reviewing the contents of a voice message.

The services of media converter, 32 of FIG. 1, are used to review the contents of dynamic image annotations and video messages both of which have aural and visual representations. For dynamic annotations, U.S. patent application Ser. No. 08/560,566 filed Nov. 20, 1995, entitled "A Multimedia-based Reporting System With Recording And Playback Of Dynamic Annotation", assigned to the same assignee as the present invention, teaches the use of three separate components in the storage organization of the multimedia object: an audio file with the voice comments, an image file with the bitmap(s), and a text file with gestures and graphics. Similarly, U.S. Pat. No. 5,521,841 entitled "Browsing Contents Of A Given Video Sequence", assigned to the same assignee as the present invention, teaches an organization of the video file that includes the video itself plus auxiliary data in the form of a scene change list and a collection of frame icons that show the contents of the video during scene changes.

Figure 10:
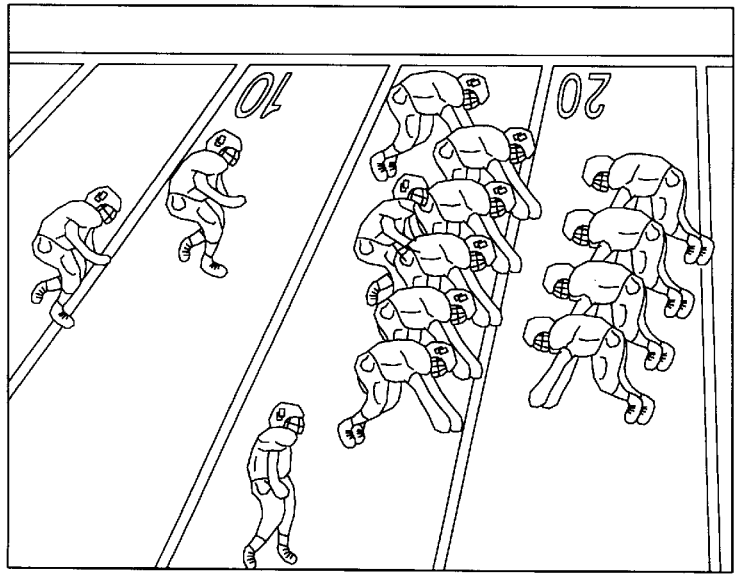
FIG. 10 illustrates an example of the results produced by the media converter of the present invention in response to a request for phone/fax access to an annotation.
Figure 11:
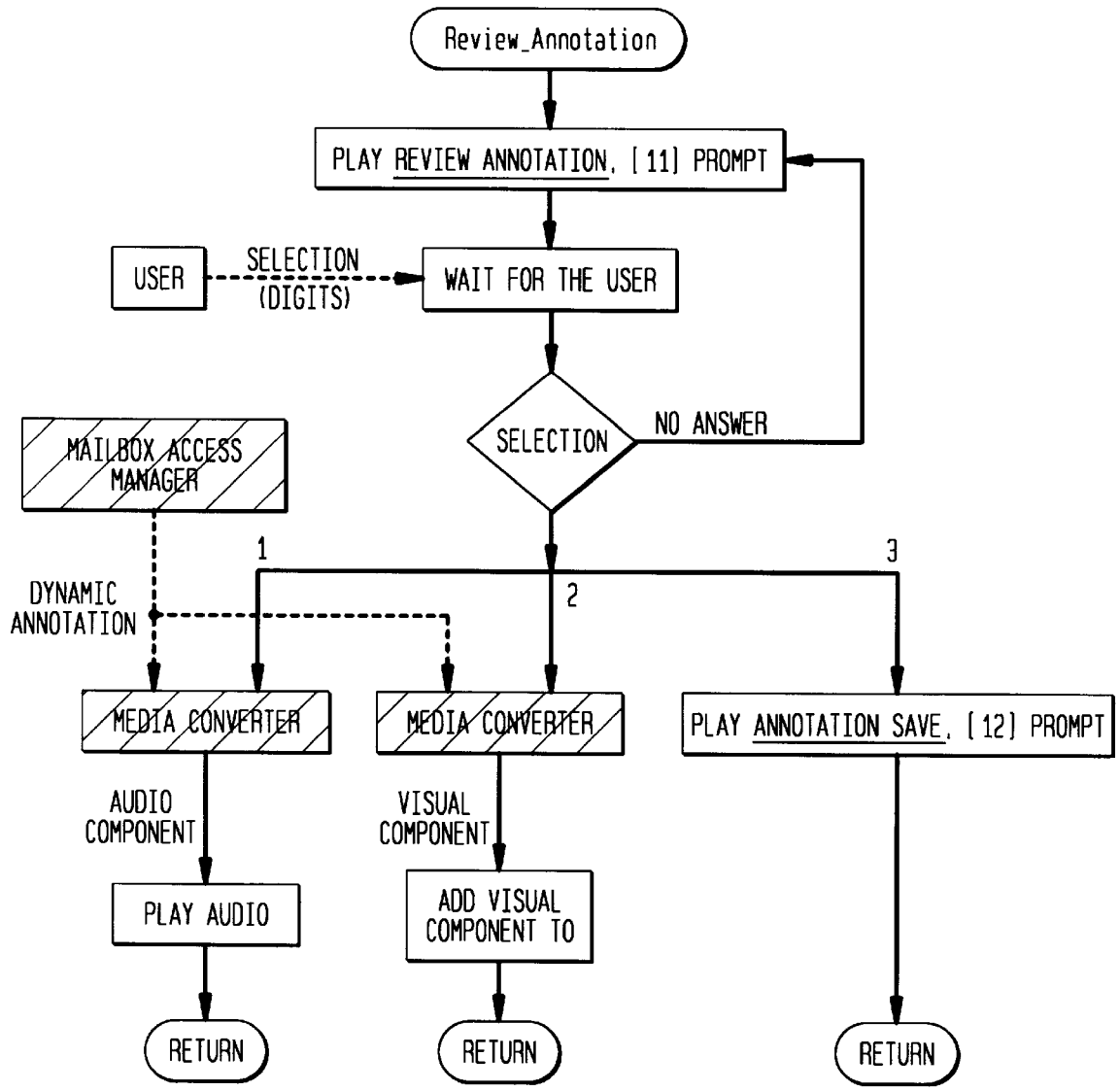
FIG. 11 illustrates a flow diagram of the operation of the telephony attendant of the present invention during an annotation review process.

FIG. 10 shows a sample of the results produced by the media converter when applied to a dynamically annotated image. The aural component is copied directly out of the stored representation into an intermediate voice file that can be played over the phone. The algorithms described in , U.S. patent application Ser. No. 08/560,566 filed Nov. 20, 1995 are utilized to playback the dynamic annotation and are then used to produce the visual representation that contains the base images as well as the drawings as they would appear at the end of the annotation playback. FIG. 11 shows a flow diagram of the operation of the telephony attendant during the annotation review process.

The algorithms used in the media converter to decompose a video message are described in U.S. Pat. No. 5,521,841.

Figure 12:
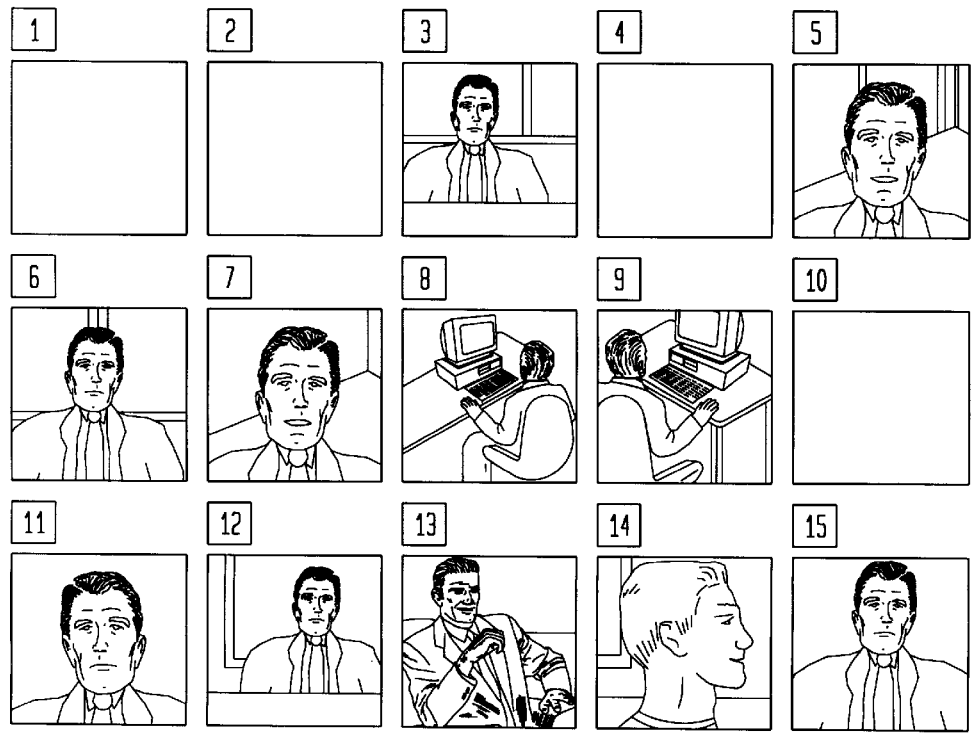
FIG. 12 illustrates an example of a video fax of the present invention.
Figure 13:
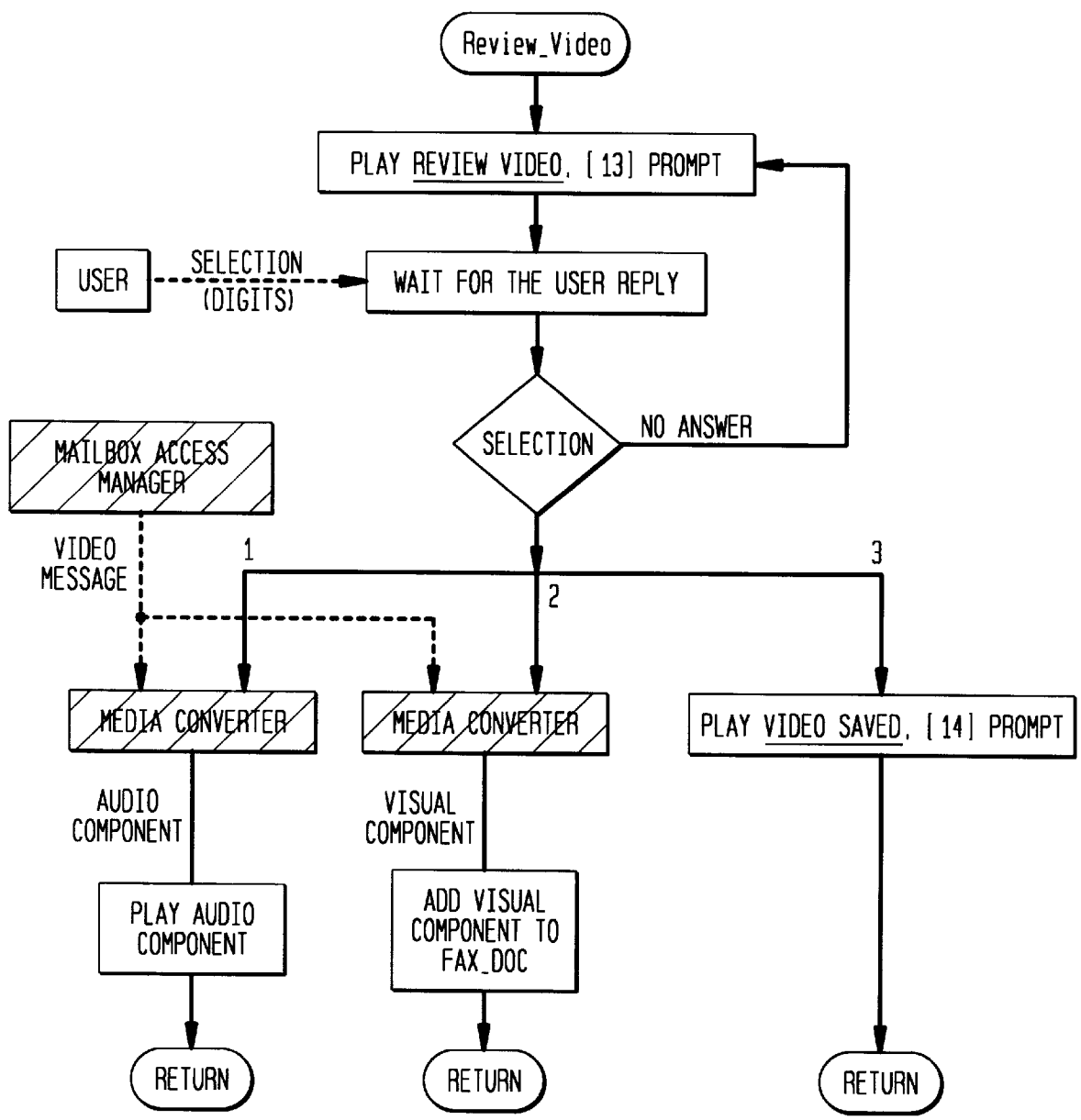
FIG. 13 illustrates a flow diagram of the operation of the telephony attendant of the present invention during a video review process.

FIG. 12 shows a sample video fax. The audio track of the video is accessed in a telephone call during which users can control the playback of the audio track using the keypad. In addition to having pause/resume capabilities, the user is also able to jump to specific video shots by entering the numeric id associated to each shot in the sequence. FIG. 13 shows a flow diagram of the operation of the telephony attendant during the video review process.

Figure 14:
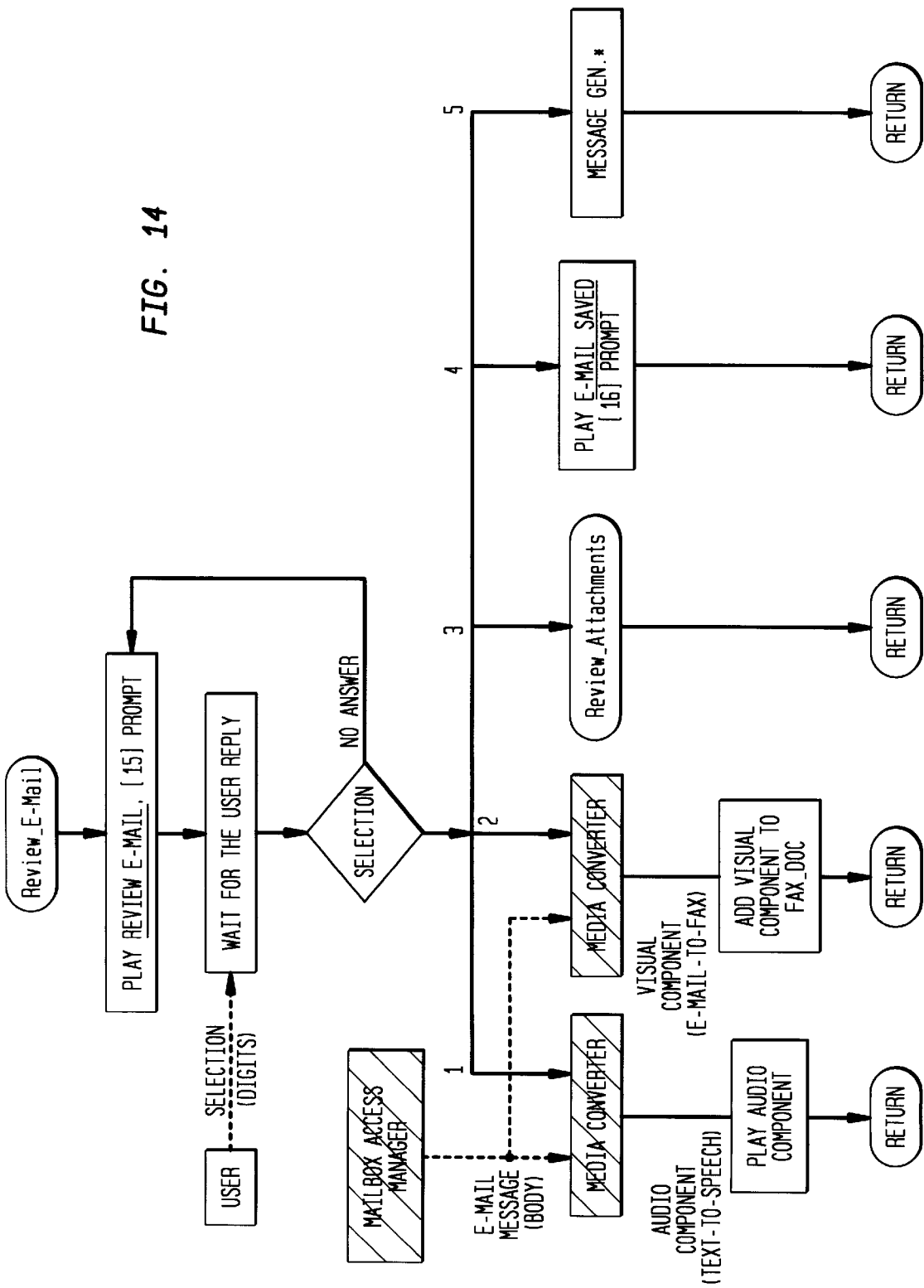
FIG. 14 illustrates a flow diagram of the operation of the telephony attendant of the present invention during an E-Mail review process.
Figure 16:
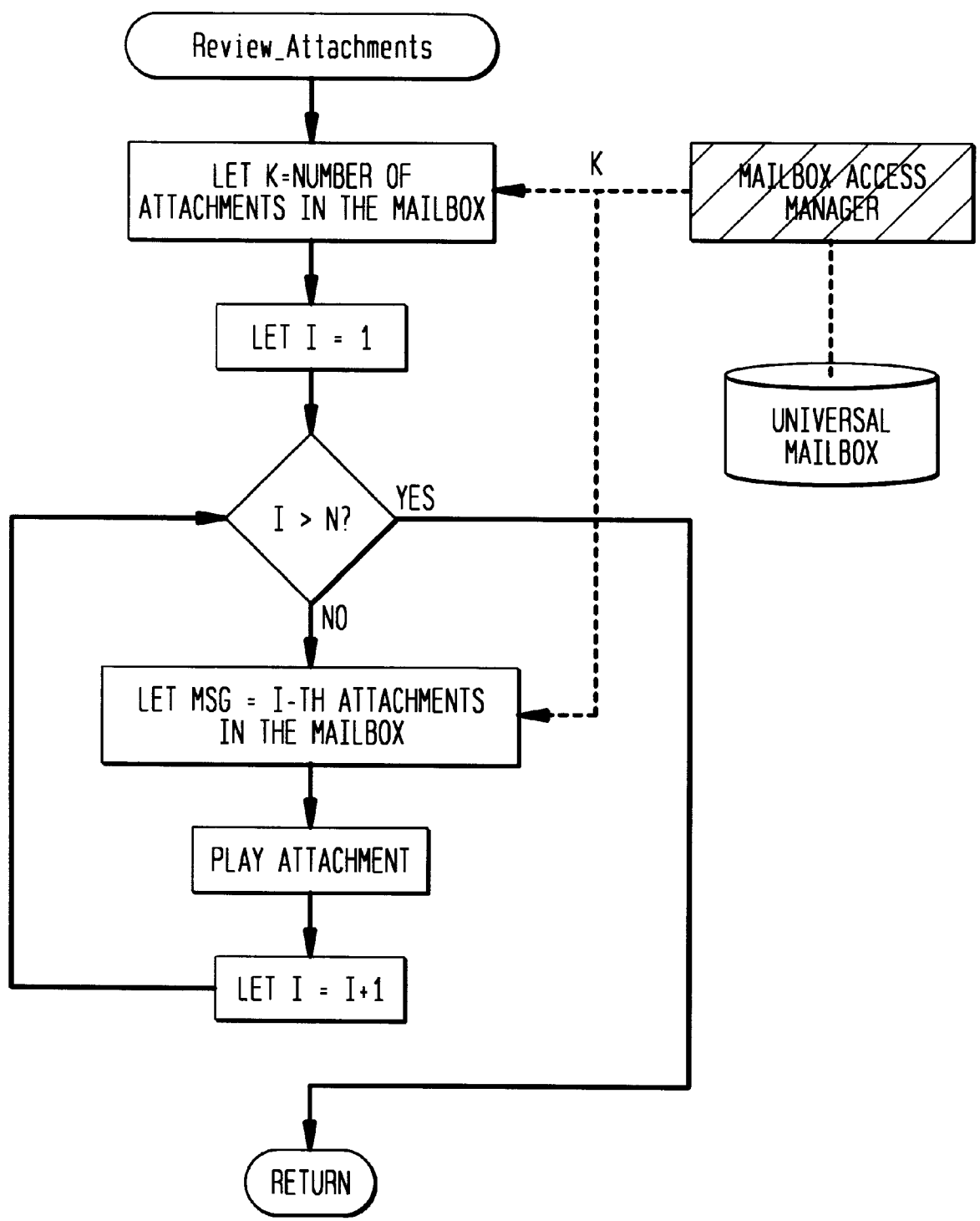
FIG. 16 illustrates a flow diagram of the operation of reviewing individual attachments.

The last component of the telephony attendant is the e-mail reviewing process. The system of the present invention performs the task in two steps, first giving the caller information about the main message, then allowing for the review of message attachments. FIG. 14 illustrates the flow diagram of the steps in this interaction. Once again the user is given the option to receive an audible version of the message over the phone, or to receive a visual copy through the fax. For the audible version, a commercial text-to-speech engine included in the media converter translates the message body. For the faxed version, a telefax transmittal similar to the sample shown in FIG. 15 is generated, also by the media converter, using an off-the-shelf word processing system (e.g., MS Word 6.0). FIG. 16 illustrates a flow diagram of the process used to review individual attachments.

The following list contains examples of textual representations of system prompts. These prompts could be recorded as voice during the implementation of the system.

| Prompt | Content |
| --- | --- |
| [1] Greeting | "Hello, you have reached the universal mailbox of <USER NAME>. Please enter your password." |
| [2] Unauthorized User | "The password is incorrect" |
| [3] Dismissal | "Good bye!" |
| [4] Mailbox Review | "To receive a summary of the mailbox via fax press 1. To review the messages in detail press 2. To exit press 3." |
| [5] Review Fax | "To get a copy of this fax press 1. To save the message press 2." |
| [6] Fax Saved | "Fax Saved." |
| [7] Get Fax Number | "Please enter your fax number." |
| [8] Fax Sent | "Fax Sent." |
| [9] Review Voice | "To review this voice mail press 1. To save the message press 2." |
| [10] Voice Saved | "Voice saved." |
| [11] Review Annotation | "To review this annotation using the phone press 1. To receive a fax version of the visual components press 2. To save the message press 3." |
| [12] Annotation Saved | "Annotation saved." |
| [13] Review Annotation | "To review this video message using the phone press 1. To receive a fax version of the visual components press 2. To save the message press 3." |
| [14] Annotation Saved | "Video message saved." |
| [15] Review E-mail | "To review this e-mail message using the phone press 1. To receive a fax version of the visual components press 2. To review individual attachments press 3. To save the message press 4." |
| [16] E-mail Saved | "E-mail saved." |

It is not intended that this invention be limited by the hardware or software arrangement, or operational procedures shown disclosed. This invention includes all of the alterations and variations thereto as encompassed within the scope of the claims as follows.

We claim:

1. A system for remote phone-based access to a universal multimedia mailbox comprising:

message generator means interfacing with a universal messaging server for composing reply messages and prompts responsive to user input;

mailbox access manager means for interfacing to said universal multimedia mailbox for retrieving message components, including video and annotated image messages therefrom in accordance with the user input;

telephony attendant means connected between said message generator means and said mailbox access manager means for interfacing to a telephone network such that interactions between a user and said message generator means and said mailbox access manager means are performed to establish the message components to be retrieved;

media converter means connected to said mailbox access manager means for converting the retrieved message components to a user selected media type: and server extension means coupled to the universal messaging server for receiving and processing video and annotated image messages to be output as the user selected media type.

2. A system for remote phone-based access to a universal multimedia mailbox as claimed in claim 3 further comprising:

audio/fax player means connected to said media converter means for outputting the retrieved message components.

3. A system for remote phone-based access to a universal multimedia mailbox as claimed in claim 1 wherein:

said server extension means for supporting dynamic annotated images and video classes from message sources includes a scene detector for detecting scenes in between video images and means for segmenting annotated images with reference to one of time and space; and, an audio/fax player is connected between said media converter means and said telephone network.

4. A system for remote phone-based access to a universal multimedia mailbox as claimed in claim 1 wherein:

said telephony attendant means is capable of providing users with instructions on how to access messages and is capable of receiving commands from said users.

5. A system for remote phone-based access to a universal multimedia mailbox as claimed in claim 1 wherein:

said server extension means supports dynamic annotated images and video classes by allowing said message classes to be represented according to a known form and by facilitating pre-processing of said message classes, said preprocessing including one of segmenting the message classes with reference to one of time and space, and detecting scene changes.

6. A system for remote phone-based access to a universal multimedia mailbox as claimed in claim 1 wherein:

said message generator means interfaces to said universal multimedia mailbox through said universal messaging server.

7. A system for remote phone-based access to a universal multimedia mailbox as claimed in claim 1 wherein said mailbox access manager means comprises:

a message management library that provides access to message components contained in said universal multimedia mailbox.

8. A system for remote phone-based access to a universal multimedia mailbox as claimed in claim 1 wherein:

said telephony attendant means guides operation of said system for remote phone-based access to said universal multimedia mailbox.

9. A system for remote phone-based access to a universal multimedia mailbox as claimed in claim 1 wherein:

said telephony attendant means interacts with said mailbox access manager means which retrieves message components from said universal multimedia mailbox and interacts through said mailbox access manager means with said media converter means which receives media message components from said mailbox access manager means and performs transformations needed to present data to and from said telephone network.

10. A system for remote phone-based access to a universal multimedia mailbox as claimed in claim 1 wherein:

said mailbox access manager means examines contents of said universal multimedia mailbox and returns a count of messages found.

11. A system for remote phone-based access to a universal multimedia mailbox as claimed in claim 1 wherein:

said media converter means reviews contents of dynamic image annotations and video messages.

12. A method of providing for remote phone-based access to a universal multimedia mailbox comprising the steps of:

utilizing a message generator to interface with a universal messaging server to compose reply messages and prompts responsive to user input;

utilizing a mailbox access manager to interface with said universal multimedia mailbox to retrieve message components, including video and annotated images from said universal multimedia mailbox in accordance with the user input;

utilizing a telephony attendant such that interactions between a user and said message generator and said mailbox access manager are performed to establish the message components to be retrieved;

utilizing a media converter for converting the retrieved message components to a user selected media type; and utilizing server extensions for allowing message components including video and annotated images to be represented according to a known form and for facilitating preprocessing of said message components for output by the selected media type.

13. A method of providing for remote phone-based access to a universal multimedia mailbox as claimed in claim 12 further comprising the step of:

utilizing an audio/fax player for interfacing to a telephone network.

14. A method of providing for remote phone-based access to a universal multimedia mailbox as claimed in claim 11 wherein utilizing a telephony attendant comprises the steps of:

providing the capability for users to receive instructions on how to access messages; and, providing the capability for receiving commands from said users.

15. A method of providing for remote phone-based access to a universal multimedia mailbox as claimed in claim 11 wherein utilizing a message generator comprises the step of:

interfacing said message generator to said universal multimedia mailbox through said universal messaging server.

16. A method of providing for remote phone-based access to a universal multimedia mailbox as claimed in claim 12 wherein utilizing a mailbox access manager comprises the step of:

utilizing a message management library that provides access to message components contained in said universal multimedia mailbox.

17. A method of providing for remote phone-based access to a universal multimedia mailbox as claimed in claim 12 wherein utilizing a telephony attendant comprises the steps of:

interacting with said mailbox access manager which retrieves message components from said universal multimedia mailbox; and, interacting through said mailbox access manager means with said media converter which receives media message components from said mailbox access manager and performs transformations needed to present data to and from said telephone network.

18. A method of providing for remote phone-based access to a universal multimedia mailbox as claimed in claim 12 wherein utilizing said mailbox access manager comprises the steps of:

examining contents of said universal multimedia mailbox; and, returning a count of messages found.

19. A system for remote phone-based access to a universal multimedia mailbox comprising:

a message generator that interfaces with a universal messaging server for composing reply messages and prompts responsive to user input;

a mailbox access manager that interfaces to said universal multimedia mailbox for retrieving message components, including video and annotated images, therefrom in accordance with the user input;

a telephony attendant connected between said message generator and said mailbox access manager and interfaced with a telephone network such that interactions between a user and said message generator and said mailbox access manager are performed to establish the message components to be retrieved;

a media converter connected between said mailbox access manager and said audio/fax player for converting the retrieved message components to a user selected media type;

an audio/fax player that interfaces with said telephone network for outputting data representing the retrieved message components in the selected media type; and server extensions that interface with said universal messaging server to provide message processing for video and annotated images such that the video and annotated images are output according to the selected media type.

20. A system for remote phone-based access to a universal multimedia mailbox as claimed in claim 19 wherein:

said telephony attendant interacts with said mailbox access manager which retrieves message components from said universal multimedia mailbox and interacts through said mailbox access manager with said media converter which receives media message components from said mailbox access manager and performs transformations needed to present data to and from said telephone network.

* * * * *